United States Patent [19]
Lowi, Jr.

[11] Patent Number: 4,694,802
[45] Date of Patent: Sep. 22, 1987

[54] COMPRESSION IGNITION ENGINE FUMIGATION SYSTEM

[76] Inventor: Alvin Lowi, Jr., 2146 Toscanini Dr., San Pedro, Calif. 90732

[21] Appl. No.: 652,937

[22] Filed: Sep. 21, 1984

[51] Int. Cl.⁴ .................... F22B 37/18; F22B 9/08; F22D 1/00
[52] U.S. Cl. ........................ 123/431; 123/73 A; 123/198 A; 123/590
[58] Field of Search ............ 123/431, 525, 527, 575, 123/65 V, 73 A, 198 A, 518, 590, 236 E; 137/857, 858, 859, 860, 856

[56] References Cited

U.S. PATENT DOCUMENTS

| | | | |
|---|---|---|---|
| 3,698,365 | 10/1972 | Hallberg | 123/431 |
| 4,074,673 | 2/1978 | Rushing | 123/198 A |
| 4,180,042 | 12/1979 | Lloyd | 123/590 |
| 4,181,100 | 1/1980 | Yamane et al. | 123/431 |
| 4,224,044 | 9/1980 | King | 123/518 |
| 4,228,770 | 10/1980 | Boyesen | 123/73 A |
| 4,235,206 | 11/1980 | Boyesen | 123/73 A |

Primary Examiner—Raymond A. Nelli
Attorney, Agent, or Firm—Nilsson, Robbins, Dalgarn, Berliner, Carson & Wurst

[57] ABSTRACT

A system for mixing fumigation fuel with the intake air in a compression ignition engine includes a variable area venturi in an engine intake air duct to draw controlled amounts of a pre-mixed fumigation fuel/air mixture into the main air stream in proportion to the amount of suction created downstream of the variable area venturi by the engine air flow. The variable area venturi creates a pressure depression proportional to the engine air flow motivating the fumigation fuel/air mixture to flow into the engine along with the main air stream at a rate related to the engine load and speed. The variable area venturi includes a housing having a downstream branch connected to a conventional demand-type mixer which is supplied with the fumigation fuel via a demand-type regulator, and air through a filter from the atmosphere. The variable area venturi is formed by a spring-loaded, normally closed flapper valve which variably opens in response to air drawn through the housing by the engine. The variable area venturi thus created provides a proportional control of the fumigation fuel introduced into the main air stream over a wide range of engine operating conditions with relatively small pressure drops.

23 Claims, 3 Drawing Figures

COMPRESSION IGNITION ENGINE FUMIGATION SYSTEM

BACKGROUND

This invention relates to the controlled use of supplementary fuels in compression ignition engines and more particularly to a system that includes a variable area venturi in the main air supply to the engine for creating a variable downstream vacuum which variable draws a constant porportion fumigation fuel/air mixture into the main airstream to the engine in response to variations in engine load and speed.

The supplemental fueling of a diesel engine by feeding fuel vapors into the main intake air (herein referred to as fumigation) is known to improve power output and service life while reducing fuel consumption, pollution output and noise level of the engine. Fumigation also permits lesser quality primary fuels to be used to fuel a diesel engine in substitution for at least a portion of the higher quality diesel fuel normally required. Although the fumigation fuel may be the same as the primary engine fuel, in most applications the fumigation fuel will be a different fuel such as propane.

Various fumigation systems have been implemented to achieve these results. For example U.S. Pat. No. 3,698,365 to Hallberg discloses one fumigation system widely practiced on a variety of farm tractors. In Hallberg, a fumigation fuel, such as propane, is metered through a small spud, located in the air intake, to the air inlet manifold of a diesel engine. The metering device is a rotary barrel type of valve having a V-shaped slot orifice in the barrel at right angles to the axis of the barrel. As the barrel is rotated, the V-shaped slot progressively opens or closes to the passage of propane through the valve. Propane is supplied to the valve from a propane source at high pressure. The pressure is reduced to a useable level by a conventional pressure regulator. The valve is mechanically linked to the diesel injection control which controls the speed of operation of the diesel engine. The spud is located and arranged so as to achieve a suitable mixture distribution of the supplemental propane fuel vapor to each cylinder.

Various applications and modifications of the fumigating technique disclosed in Hallberg have been designed and built into the control valve to facilitate linkage simplification. However, devices to accurately and reproducibly deliver fuel according to a predefined schedule with adequate fuel distribution in multi-cylinder engines has proved to be difficult to achieve with simple spud arrangements. Compromises to alleviate such difficulties have resulted in suboptimal operation. Additionally, installation of Hallberg type systems is difficult and mechanical reliability frequently unacceptable.

Another technique for diesel engine fumigation disclosed by Govindara et. al. in SAE Paper No. 810347 utilizes two valves coupled to a Y or T connector on the air intake manifold of the engine. The first valve controls the flow of air from the atmosphere. The second valve is part of a vapor carburetor that automatically prepares a uniform fumigation fuel/air mixture. The two valves are linked, generally in a non-linear manner, to the diesel injection control and to each other. Compromises to the ideal fumigation fuel schedule are generally made as a means of avoiding mechanical complications in the multiple linkages. Such compromises result in limitations in fumigation and hence engine operation.

Diesel engine fumigation has also been used in diesel driven irrigation pumps where the engine operates at a constant speed. One such system is the McClure-Deutz System described in an article entitled "Pilot Fuel Improves Irrigation Economies" by Bill Roberts, *Diesel Progress North America,* March, 1983, at pages 53–55. Such irrigation pump systems avoid the mechanical complexity of either of the two prior methods by carbureting the entire engine air flow with the fumigation fuel. However, such systems have unacceptable characteristics for engines operating at varying loads and speeds as is the case with motor vehicles.

By contrast to the above systems, the present invention comprises a venturi with a throat which has a variable opening which allows for fumigation over a wide range of operating loads and speeds with the proportion of fumigation fuel drawn into the engine being controlled by the engine air flow or suction. This air flow causes variations in the proportion of fumigation fuel in the air drawn into the engine according to a preset schedule over the range of engine loads and speeds. The resultant system is simple and easily retrofitted to existing engines. The variable opening venturi is also adjustable to enable the attainment of various schedules of fumigation fueling depending on operational desires and engine ratings.

SUMMARY OF THE INVENTION

A fumigation system in accordance with the invention is useful in connection with a compression ignition engine having an air intake manifold. The fumigation system is operable for variably metering a constant proportion, fumigation fuel/air mixture into a main air flow drawn by the engine. The fumigation system comprises a variable throat area venturi apparatus positioned so that the main air flow drawn by the engine passes through the variable venturi. The variable venturi includes a housing having an air intake port, an output port communicating with the intake manifold of the engine, a main passageway between the air intake port and the output port, and a branch port. The constant proportion fumigation fuel/air mixture is drawn into the main passageway through the branch port. The variable venturi further includes a variable throat restriction means which defines a variable area throat in the main passageway. The branch port is positioned between the variable restriction means and the air intake manifold. The variable restriction means therefore creates a variable pressure drop at the branch port in response to variations in the air flow through the throat.

In addition to the variable venturi, the fumigation system further includes a mixer which is coupled for receiving a quantity of fumigation fuel and mixing it with air in a substantially constant proportion to create a constant proportion fumigation fuel/air mixture. The mixer has an output port which is coupled to the branch port of the variable venturi for delivering the constant proportion fumigation fuel/air mixture generated by the mixer to the main air passageway and thereafter to the intake manifold. The constant proportion fumigation fuel/air mixture generated by the mixer is variably drawn into the main passageway in response to the variable pressure drop created by the variation of the throat area of the restriction means in response to engine air flow passing through the main air passageway.

The fumigation system may further comprise a fumigation fuel tank, a regulator (which is preferably a demand regulator) coupled to the fumigation fuel tank for regulating the flow of fumigation fuel from the fumigation fuel tank, and a solenoid valve coupled between the fumigation fuel tank and the regulator. The solenoid valve is connected to an electric power supply via one or more switches coupled in series to close the solenoid valve and thereby prevent a flow of fumigation fuel from the fumigation fuel tank if certain engine operation conditions occur. For example, one such switch may be the ignition switch whereby the solenoid valve is closed to prevent the flow of fumigation fuel when the ignition of the engine is turned off. Similarly, an oil pressure switch may be incorporated to turn off the supply of fumigation fuel by closing the solenoid valve if the oil pressure of the engine falls below a predefined safety level. Also, a fumigation fuel pressure switch may be coupled to the regulator to close the solenoid valve if the pressure of the fumigation fuel in the regulator reaches unacceptable levels. Finally, a switch responsive to engine speed may be used to open the solenoid valve circuit and close fuel supply if the engine speed should exceed a predefined level.

The flow restrictor means of the variable venturi may further comprise a bias means which is interconnected for altering the responsiveness of the restrictor means to air flow through the main passageway.

Finally, the variable venturi may include guide means guidingly interconnected between the housing and the restrictor means for guiding the restrictor means in the main passageway in accordance with a preselected continuum of positions in response to air flow through the main passageway.

BRIEF DESCRIPTION OF THE DRAWINGS

In the drawings, which constitute a part of this specification, an exemplary embodiment demonstrating the various features hereof is set forth as follows.

DETAILED DESCRIPTION

Figure 1:
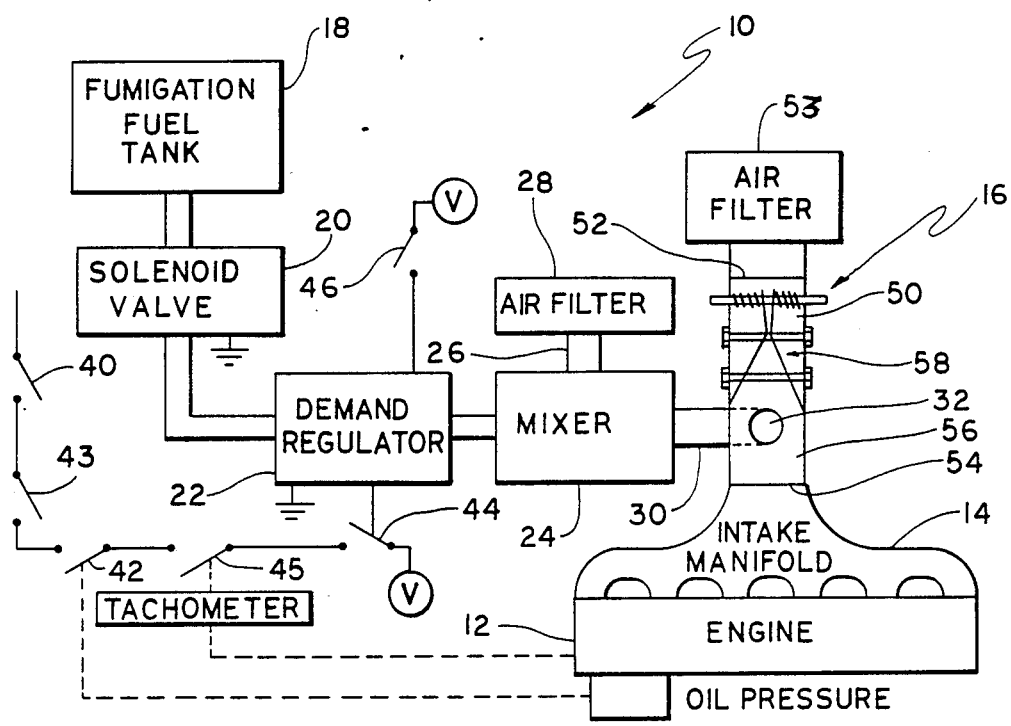
FIG. 1 is a simplified block diagram of the diesel fumigation system in accordance with the invention.

Referring initially to FIG. 1, a fumigation system 10 for a compression ignition engine such as a 5 diesel engine 12 having an intake manifold 14, consists a solenoid valve 20 connected to the fuel outlet of the fumigation fuel tank 16, a demand regulator 22 coupled to the solenoid valve 20, and a mixer 24 coupled to the output of the demand regulator 22. The mixer 24 has an air intake 26 which may be coupled to a suitable air filter 28 and an output 30 which is coupled to a branch port 32 in the variable venturi 16.

The variable venturi 16 comprises a housing 50 which has an intake port 52 at one end. The intake port 52 may be coupled to a suitable air filter 53. The housing 50 also has an output port 54 at its other end with the housing 50 defining a main air passageway 56 between the intake port 52 and the output port 54. Positioned in the interior of the housing in the main passageway 56 is a flow restrictor means 58 which variably opens and closes the main passageway 56 in response to air flow through the main passageway 56 generated by the engine 12. The restrictor 58 thus defines a throat in the main passageway 56 where the size of the throat varies as the air flow varies.

When the engine 12 is idling, for example, the air flow through the main passageway 56 caused by the suction of the engine 12 is small and therefore little force develops across the restrictor 58 to cause the restrictor 58 to open to any significant degree. The venturi effect caused by air flow across the throat of the restrictor 58 causes a vacuum to develop downstream of the restrictor 58 which, if strong enough, actuates the mixer 24 to produce the constant proportion fumigation fuel/air mixture which is drawn through the branch port 32 into the main air stream in the main air passageway 56. To achieve this effect, the branch port 32 is located between the restrictor 58 and the intake manifold 14 and preferably at the location immediately behind the restrictor 58 where the vacuum created by the venturi effect of the restrictor 58 is greatest.

The mixer 24 is not actuated unless a sufficient negative pressure exists at the branch port 32 and hence the output port 30 of the mixer 24. Once a sufficient negative pressure has been developed at the branch port 32, the mixer 24 is actuated and a negative pressure is applied at the regulator 22. The regulator 22 is then actuated by the negative pressure to supply fumigation fuel to the mixer 24. The mixer 24 mixes the fumigation fuel with air from the air intake port 26. The mixer 24 is constructed so that the proportion of air and fumigation fuel delivered from the mixer 24 through the branch port 32 is virtually constant regardless of the magnitude of the vacuum at the branch port 32.

If the negative pressure or vacuum created by the variable area venturi 16 in response to the flow of air in the main passageway 56 is low, then the mixer 24 as well as the demand regulator 22 remain closed to fumigation fuel flow and no fumigation fuel will be drawn through the branch port 32. Thus, if the engine is stalled or turned off fumigation fuel is locked off at both the mixer and the regulator. As the air flow to the engine increases because the load and speed of the engine 12 increases, the restrictor 58 will open. This results in an increasing negative pressure (vacuum) at the branch port 32. When a certain magnitude of vacuum develops at the branch port 32, a sufficient pressure difference develops across the mixer 24 to lift its fuel metering mechanism (not shown) and allow the fumigation fuel/air mixture to be made to flow into the branch port 32 and be intrained by the air flow through the main passageway 56. The fumigation fuel/air mixture drawn into the branch port 32 will be further mixed with air entering through the intake port 52, with the consequent dilution of the proportion of fumigation fuel in the total air supplied to the engine through the intake manifold. As engine loads and speeds increase, the proportion of fumigation fuel in the air supplied to the diesel engine will thus increase.

In one particular embodiment of the invention, the fumigation fuel is propane stored in liquid form in the fuel tank 18 at ambient temperatures. Between about 30 degrees and 100 degrees fahrenheit (0° to 38° C.), the vapor pressure of the propane inside the tank is between 60 and 190 PSI (414 to 1310 kPa). The high pressure propane, which may be delivered from the tank in either liquid or vapor form, is transported through appropriate fuel filters (not shown) to the solenoid valve 20. The solenoid valve 20 may be a normally-closed, large-port vapor lock-off type valve such as a Skinner Model R2LA 2200.

The solenoid valve 20 output is connected to a conventional demand regulator 22 which may also include a vaporization chamber if liquid fuel is applied. The demand regulator 22 reduces the pressure of the propane to approximately atmospheric pressure and is of a type which allows passage of propane only if there is a slight negative pressure (i.e. suction) at its outlet. The outlet of the regulator 22 communicates with the mixer 24 which is also actuated only if a negative pressure exists at the branch port 32 and is above a defined threshold. Therefore, the regulator 22 supplies fumigation fuel only if the mixer 24 is opened which requires that a negative pressure be applied at its outlet port in excess of the predetermined mixer threshold. One acceptable regulator is the two-stage type regulator having a second stage which automatically locks off the fuel when there is no demand such as an Impco Model E converter/regulator.

The regulator 22 is connected to the mixer 24 which is similar to a carburetor but without a butterfly throttle plate. One such mixer may be an Impco Model 225 mixer which has a variable-area air venturi and a variable-area fuel orifice.

In accordance with combustion theory, optimum fumigation rates are generally low at low load levels after which the ideal fumigation rate will increase in a linear fashion as the engine load increases. Because of the low effectiveness of fumigation at low load levels, the overall efficiency of the system from both operational and cost perspectives may be optimized by adjusting the variable area venturi 16 to actuate the mixer 24 to supply fuel only after a predefined intermediate load level is reached.

It will be appreciated that various system parameters can be varied to alter the portion of fumigation fuel/air mixture from the mixer 24 with the main air flow passing through the main passageway 56. Such parameters include, for example, the location of the branch port 32 in comparison to the narrowest region or throat of the restrictor 58; the size of the branch port opening in comparison to the area of the main passageway; the lever arm of the flow restrictor means 58; the area of the blades of the flow restrictor (to be described hereafter); and the various characteristics of the spring means (to be described hereafter) which urges the flow restrictor means 58 into a normally closed position. It has been found, however, that virtually all desired adjustment settings to achieve desired engine operation can be achieved by simply selecting a structurally reasonable configuration for each of these parameters and then providing a set of springs of selected elastic characteristics and a compression adjustment or tension adjustment for those spring means. Stated differently, while each of these parameters affects engine performance, engine performance is relatively insensitive to variations of these parameters so that sufficient adjustment to account for virtually any desired operating schedule can be achieved by simply varying the sensitivity of the flow restrictor means to a given air flow through the main passageway 56. Consequently, the spring balance in the present variable venturi is such that the preload on that spring can be adjusted to achieve any desired adjustment of the vacuum resulting from the venturi affect to achieve the desired schedule of fumigation fuel to be delivered to the engine at different loads.

It will be further appreciated that in a compression ignition type engine, the engine can "run away" by simply supplying greater amounts of fuel to the engine than its load requires. The engine can be severely damaged or destroyed if allowed to "run away". Consequently, the present invention may also include various safety switches which are connected to the solenoid valve 20 so that if an undesirable operating condition occurs, the solenoid valve will cut off the supply of fumigation fuel to the engine.

Referring again to FIG. 1, an ignition switch 40; a manual switch 43; an oil pressure switch 42, an over speed switch 45 and a fumigation fuel pressure switch 44 are coupled in series in the electric power supply to the normally-closed solenoid valve 20. In operation, when the ignition of the engine is off, the ignition switch 40 will be opened thereby disabling the solenoid valve and preventing fumigation fuel from passing from the fuel tank 18 to the demand regulator 22. When the engine is started, the ignition switch 40 is closed thereby enabling the solenoid valve to open hence enabling the fumigation fuel to flow through the solenoid valve 20. Similarly the oil pressure switch 42, in series with the ignition switch 40, effects closure of the solenoid valve 20 if the oil pressure is at unacceptable levels. Similarly, the system in accordance with the invention may include a pressure switch 44 coupled to the test port which is available on all commercially sold demand regulators so that if the pressure of the demand regulator is within an acceptable range, the solenoid valve is enabled but if the fuel pressure is other than within acceptable ranges, the pressure switch 44 opens causing the solenoid valve to close preventing the flow of fumigation fuel from the tank 18. The pressure switch 44 may be any of a number of commercially available switches such as the Hobbs model M4012-4 switch. Any other safety switches such as an overspeed switch 45 may be similarly placed in series with switches 40, 42 and 44 to close the solenoid valve 20 and cut off the flow of fumigation fuel from the fuel tank 18 if unacceptable engine operation is sensed.

The system of FIG. 1 may further include a manually operated, momentary primer switch 46 coupled to a solenoid-operated feature (not shown) to cause the regulator 22 to open or bypass a small amount of fumigation fuel directly into the mixer at a higher than normal pressure forcing the mixer fuel valve to open and allow the fuel to pass into the main passageway 56. It has been found that such direct injection allows the fumigation fuel to be used as an ignition assist fuel to enable the engine to be easily started in a cold condition or when the glow plug system is non-operational. As such, the present invention may eliminate the need to inject ether or another starter fluid to get the compression ignition engine started.

Figure 3:
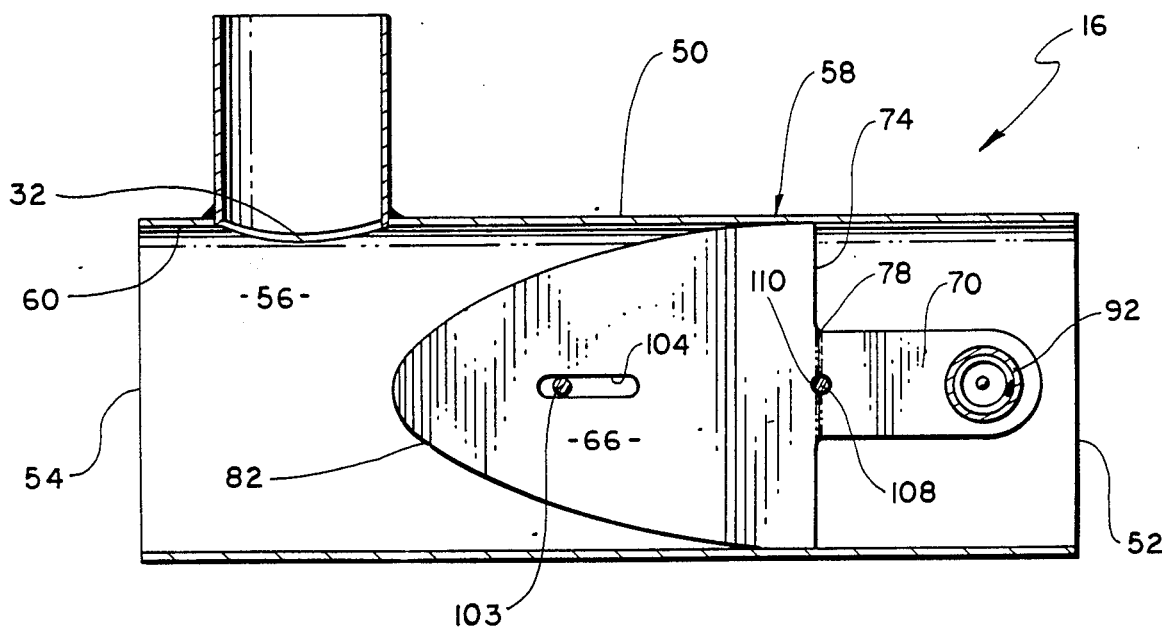
FIG. 3 is a cross-sectional side view of the variable area venturi of FIG. 2.
Figure 2:
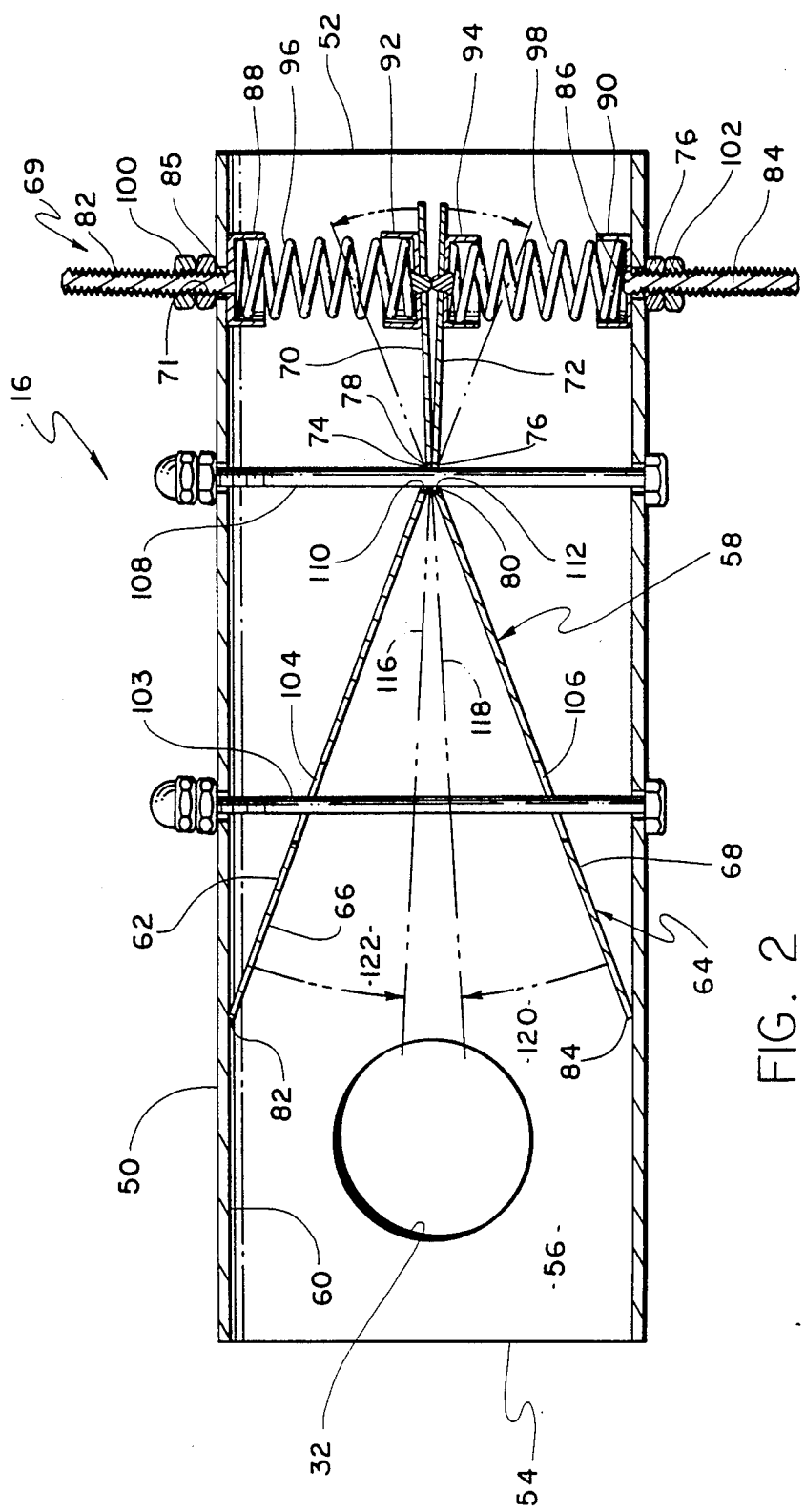
FIG. 2 is an enlarged, cross-sectional top view of a variable area venturi in accordance with the invention.

Turning to FIG. 2 in conjunction with FIG. 3, the housing 50 is cylindrical with a cylindrical inner surface 60. The branch port 32 extends through the side-wall of the housing 50 downstream of the flow restrictor means 58, i.e., between the restrictor means 58 and the intake manifold 14.

The restrictor means 58 includes a first flapper 62, and a second flapper 64. The flappers 62 and 64 have planar blade regions 66 and 68 respectively, and tail regions 70 and 72 respectively. The tail regions 70 and 72 extend from rear edges 74 and 76 of the respective blade regions 66 and 68. The tail regions 70 and 72 are angled away from the plane of the planar blade regions 66 and 68 to define fulcrum regions 78 and 80 between the tail 70 and the planar blade region 66 and the tail 72 and the planar blade region 68 respectively.

In the embodiment illustrated, the flappers 62 and 64 have peripheral closure edges 82 and 84 respectively, which are sized and shaped to mate with a predefined section of the inner surface 60 of the housing 50 to enable the main passageway 56 to be substantially closed by flappers 62 and 64 when the flappers 62 and 64 are pressed against the inner surface 60. If the inner surface 60 is cylindrical as illustrated, the shape of the peripheral closure edges 82 and 84 will be elliptical to effect such closure. However, it will be appreciated that the housing may be any other shape with the closure edges 82 and 84 shaped to mate with inner surface 60.

It will also be appreciated that other embodiments are possible which are more compact and in which, for example, the flappers 62 and 64 are positioned substantially radially relative to the axis of the main passageway 62 to achieve the same result.

The variable venturi 16 further includes a bias means 69, which is preferably adjustable to selectively alter the sensitivity of flappers 62 and 64 to opening in response to a given air flow impinging against the blade regions 66 and 68. In the illustrated embodiment, the bias means 69 includes threaded bosses 71 and 76 in the housing 50. A first threaded stud 82 is screwed into the threaded boss 71 and a second threaded stud 84 screwed into the threaded boss 76 in the housing 50. The threaded studs 82 and 84 have outer retainer cups 88 and 90 disposed on their inner ends 85 and 86 respectively. These retainer cups 88 and 90 are located in the main passageway 56. The threaded studs 82 and 84 are aligned and positioned to extend through the housing 50 opposite the tails 70 and 72 of the flappers 62 and 64 respectively. Affixed to the tail 70 of the first flapper 62 is a first inner retainer 92 and affixed to the tail 72 of the second flapper 64 is a second retainer 94. A first compression spring 96 is positioned between the outer retainer 88 and the inner retainer 92 with the ends of the spring 96 being retained in the respective retainers. Similarly, a second compression spring 98 is positioned with its respective ends in the inner retainer 94 and outer retainer 90 to be held thereby.

To adjust the compression of the springs 96 and 98 and hence the force required to move the first flapper 62 and the second flapper 64 toward each other in response to the force of a given air flow generated by the engine, the threaded studs 82 and 84 are screwed inwardly or outwardly to decrease or increase the distance between the respective outer retainers and inner retainers and thereby increase or decrease the compression force generated by the springs.

Once the threaded studs 82 and 84 have been adjusted, suitable jam nuts 100 and 102 may be placed on the threaded studs 82 and 84 respectively and screwed down against the bosses 71 and 76 to thereby prevent further rotation of the threaded studs 82 and 84.

It will be appreciated, of course, that the bias means 69 could also be a single tension spring positioned between the respective tails 70 and 72 or could be a pair of tension springs attached to the blade regions to pull them apart or a compression spring between the blade members to push the blade regions apart.

In accordance with the invention, the variable venturi 16 may also include guide means to prevent the respective flappers 62 and 64 from moving axially in the main passageway 56 or in a manner which would cause binding of the blades in a particular position. In the illustrative embodiment shown in FIGS. 2 and 3, the guide means comprises a first guide rod 103 which extends between opposite sides of the housing 50 transversely across the main passageway 56 and through a first slot 104 at a central location of the blade region 66 of the first flapper 62 and a second slot 106 at a central location of the blade region 68 of the second flapper 64. The first guide rod 103 is positioned so as to prevent side-to-side movement of the first flapper 62 and second flapper 64 as those flappers open and close in response to the air flow through the main passageway 56. Any side-to-side movement will cause the sides of the respective slots 104 and 106 to come in contact with the guide rod 103, thereby preventing further side-to-side movement which could result in binding.

The guide means further includes a second guide rod 108 likewise extending transversely across the main passageway 56 between opposite sides of the housing 50. The second guide rod 108 extends through orifices 110 and 112 in the respective fulcrums 78 and 80 of the first and second flappers 62 and 64, and prevent the flappers 62 and 64 from axial movement along the main passageway 56 in response to engine air flow.

In operation, air flow caused by engine operation will cause a suction force to be applied against the blade regions 66 and 68 of the first and second flappers 62 and 64, causing them to rotate about their respect fulcrums 78 and 80, which are positioned against each other, to open as illustrated by broken lines 116 and 118 respectively. The springs 96 and 98 which are part of the bias means 69, will apply a counter force inhibiting the opening of the flappers 62 and 64 and will maintain the flappers 62 and 64 in a normally closed position in the main passageway 56 in the absence of air flow.

When the force applied by the air flow against the blade region 66 and 68 of the flappers 62 and 64 is fully counteracted by the compression forces applied by the compression springs 96 and 98, the flapper 62 and 64 will stop pivotal movement about the fulcrums 78 and 80. The size of the throat 120 and 122 between the edges 82 and 84 of the flappers 62 and 64, and the interior surface 60 of the housing 50, in combination with the speed of the air flow through the throat 120 and 122 of the above-described restriction will generate a vacuum downstream of the throat 120 and 122 which will be applied at the branch port 32 causing the fumigation fuel/air mixture from the mixer to be drawn into the main passageway 56 and mixed with the air flow passing through that passageway 56. The size of the throat or opening 120 and 122 will determine the amount of vacuum force applied at the branch port 32 so that as the vacuum force increases the percentage of fumigation fuel/air mixed with the main air supply passing through the main passageway 56 will increase.

While the present invention has been described in connection with the specific embodiment shown in the Figures, it will be appreciated that various other embodiments are possible without departing from the spirit and scope of the invention. It is therefore the objective of the appended claims to encompass all embodiments as fall within the true spirit and scope of the invention.

What is claimed is:

1. A variable area venturi apparatus for variably metering a constant proportion fumigation fuel/air mixture into a main air flow supplied to a compression ignition engine having an intake manifold, comprising:

a housing defining an inner surface and having an air intake port, an output port for being coupled to the intake manifold, a main passageway between the air intake port and the output port through which the main air flow to the engine occurs, and a branch port coupled for enabling the constant proportion fumigation fuel/air mixture to be drawn into the main passageway to be variably mixed with the main air flow;

a variable restrictor means in the main passageway defining a variable area throat, the restrictor mean variably opening and closing to open and close the throat in response to air flow drawn through the main passageway by the engine for creating a variable pressure drop downstream of the throat, the branch port being positioned between the throat of the restrictor means and the intake manifold, the amount of constant proportion fumigation fuel/air mixture being drawn into the main passageway varying in response to the variable pressure drop to vary the proportion of fumigation fuel mixed with air supplied to the intake manifold.

2. The variable area venturi apparatus of claim 1 further comprising:

bias means interconnected to the restrictor means for altering the responsiveness of the restrictor means to variably opening and closing in response to main air/fuel flow drawn through the main passageway.

3. The variable venturi apparatus of claim 1 further comprising guide means guidingly interconnected between the housing and the restrictor means for guiding the restrictor means in the main passageway in accordance with a preselected continuum of positions between a fully closed position and a fully opened position.

4. The variable venturi apparatus of claim 2 further comprising guide means guidingly interconnected between the housing and the restrictor means for guilding the restrictor means in the main passageway in accordance with a preselected continuum of positions between a fully closed position and a fully opened position.

5. The variable venturi apparatus of claim 1 wherein the inner surface defines the bounds of the main passageway, the restrictor means comprising:

a pair of flappers each having a planar blade region with a peripheral closure edge and a rear edge, the rear edges of the pair of flappers positioned adjacent each other for enabling pivotal movement of the blade region of each flapper substantially about its rear edge to variably open and close the main passageway through the housing.

6. The variable venturi apparatus of claim 2 wherein the inner surface defines the bounds of the main passageway, the restrictor means comprising:

a pair of flappers each having a planar blade region with peripheral closure edge and a rear edge, the rear edges of the pair of flappers positioned adjacent each other for enabling pivotal movement of the blade region of each flapper substantially about its rear edge to variably open and close the main passageway through the housing.

7. The variable venturi apparatus of claim 5 wherein each flapper further comprises:

a tail region extending from the rear edge to define a fulcrum along the rear edge between the tail region and the blade region, the tail region angled away from plane of the blade region, and the bias means comprises:

spring means interconnected to the tail regions of the pair of flappers for urging the tail regions in a direction which causes the blade regions to move apart from each other toward the inner surface of the housing.

8. The variable venturi apparatus of claim 6 wherein each flapper further comprises:

a tail region extending from the rear edge to define a fulcrum along the rear edge between the tail region and the blade region, the tail region angled away from plane of the blade region, and the bias means comprises:

spring means interconnected to the tail regions of the pair of flappers for urging the tail regions in a direction which causes the blade regions to move apart from each other toward the inner surface of the housing.

9. The variable venturi apparatus of claim 5 wherein the shape of the closure edge of each flapper is selected to conform to the shape of the region of the inner surface of the housing against which the closure edge presses when there is no air flow through the main passageway.

10. The variable venturi apparatus of claim 9 wherein the shape of the closure edge of each flapper is selected to conform to the shape of the region of the inner surface of the housing against which the closure edge presses when there is no air flow through the main passageway.

11. The variable venturi apparatus of claim 5 where the inner surface of the housing is cylindrical and the closure edge is elliptical.

12. The variable venturi apparatus of claim 6 wherein the inner surface of the housing is cylindrical and the closure edge is elliptical.

13. The variable venturi apparatus of claim 2 wherein the housing has a pair of threaded bosses therethrough, the bias means comprising:

a first spring having a first end and a second end, the second end connected to the tail region of one of the flappers; and a second spring having a first end and a second end, the second end connected to the tail region of the other of the flappers;

a threaded first stud threaded through one of the threaded bosses in the housing and having a first end positin in the main passageway;

a first outer retainer attached to the first end of the first stud, the first end of the first spring retained in the first outer retainer;

a threaded second stud threaded through the other of the threaded bosses in the housing and having a first end positioned in the main passageway; and a second outer retainer attached to the first end of the second stud, the first end of the second spring retained in the second outer retainer, the first and second studs being rotatable in the threaded bosses to alter the compression of the first and second springs.

14. The variable venturi apparatus of claim 7 wherein each flapper has fulcrum orifice therethrough at its fulcrum and a slot at a central location of the planar blade region, the guide means comprising:

a first guide rod interconnected transversely across the main passageway and positioned for passing through the slot in each of the pair of flappers; and a second guide rod interconnected transversely across the main passageway and positioned for passing through the fulcrum orifice of each flapper.

15. The variable venturi apparatus of claim 8 wherein each flapper has a fulcrum orifice therethrough at its fulcrum and a slot at a central location of the planar blade region, the guide means comprising:
- a first guide rod interconnected transversely across the main passageway and positioned for passing through the slot in each of the pair of flappers; and
- a second guide rod interconnected transversely across the main passageway and positioned for passing through the fulcrum orifice of each flapper.

16. A fumigation system for a compression ignition engine having an intake manifold for variably metering a constant proportion fumigation fuel/air mixture into a main air flow drawn by the engine, the fumigation system comprising:
- a variable venturi comprising:
  - a housing having an air intake port, an output port coupled to the intake manifold, a main passageway between the air intake port and the output port, and a branch port through which the constant proportion fumigation fuel/air mixture is drawn into the main passageway; and
  - a variable throat restrictor means in the main passageway defining a throat in the main passageway for creating a variable pressure drop at the branch port in response to a variable air flow through the throat, the branch port being positioned between the variable throat restrictor means and the intake manifold; and
- a mixer coupled for receiving a quantity of fumigation fuel and mixing it with air in a substantially constant proportion to create the constant proportion fumigation fuel/air mixture, the mixer having a mixer output port coupled to the branch port of the variable venturi for delivering the constant proportion fumigation fuel/air mixture from the mixer to the main passageway and thereafter to the intake manifold, the constant proportion fumigation fuel/air mixture being variably drawn into the main passageway in response to the variable pressure drop created by the variable throat restriction means in response to the air flow through the main passageway.

17. The fumigation system of claim 16 further comprising:
- a fumigation fuel tank;
- a regulator coupled to the fumigation fuel tank for regulating the flow of fumigation fuel from the fumigation fuel tank; and
- a solenoid valve coupled between the fumigation fuel tank and the regulator.

18. The fumigation system of claim 17 wherein the regulator is a demand regulator.

19. The fumigation system of claim 16 wherein the mixer is a negative pressure mixer.

20. The fumigation system of claim 17 further comprising:
- at least one disabling switch operatively coupled to the solenoid valve to close the solenoid valve and prevent passage of fumigation fuel to the engine from the fumigation fuel tank.

21. The fumigation system of claim 20 wherein there are multiple automatic disabling switches operatively coupled in series to the solenoid valve comprising:
- an oil pressure switch for closing the solenoid valve in response to a predefined undesired oil pressure level;
- an ignition switch for opening the solenoid valve when the engine is being run;
- a fumigation fuel pressure switch coupled to the pressure regulator for closing the solenoid valve in response to a predefined undesired fumigation fuel pressure level; and
- an engine over speed switch for closing the solenoid valve in response to a predefined undesirable speed level.

22. The fumigation system of claim 16 wherein the variable venturi further comprises:
- bias means interconnect to rhe restrictor means for altering the responsiveness of the restrictor means to air flow through the main passageway.

23. The fumigation system of claim 16 wherein the variable venturi further comprises guide means guidingly interconnected between the housing and the restrictor means for guiding the restrictor means in the main passageway in accordance with a preselected continuum of positions in response to air flow through the main passageway.

* * * * *

UNITED STATES PATENT AND TRADEMARK OFFICE
CERTIFICATE OF CORRECTION

PATENT NO.   :   4,694,802

DATED        :   SEPTEMBER 22, 1987

INVENTOR(S)  :   ALVIN LOWI, JR.

It is certified that error appears in the above-identified patent and that said Letters Patent is hereby corrected as shown below:

Col. 3, line 49, delete "5".

Col. 3, line 50, after "consists" add --of a variable area venturi 16, a fumigation fuel tank 18,--.

Col. 3, line 52, change "16" to --18--.

Col. 4, line 46, after "fuel" delete hyphen "-".

Col. 12, line 34, change "rhe" to --the--.

Signed and Sealed this

Sixteenth Day of February, 1988

Attest:

DONALD J. QUIGG

*Attesting Officer*　　　　*Commissioner of Patents and Trademarks*